March 24, 1964  R. F. REDEMSKE ETAL  3,126,511
ELECTRONIC DEVICE
Filed July 19, 1956
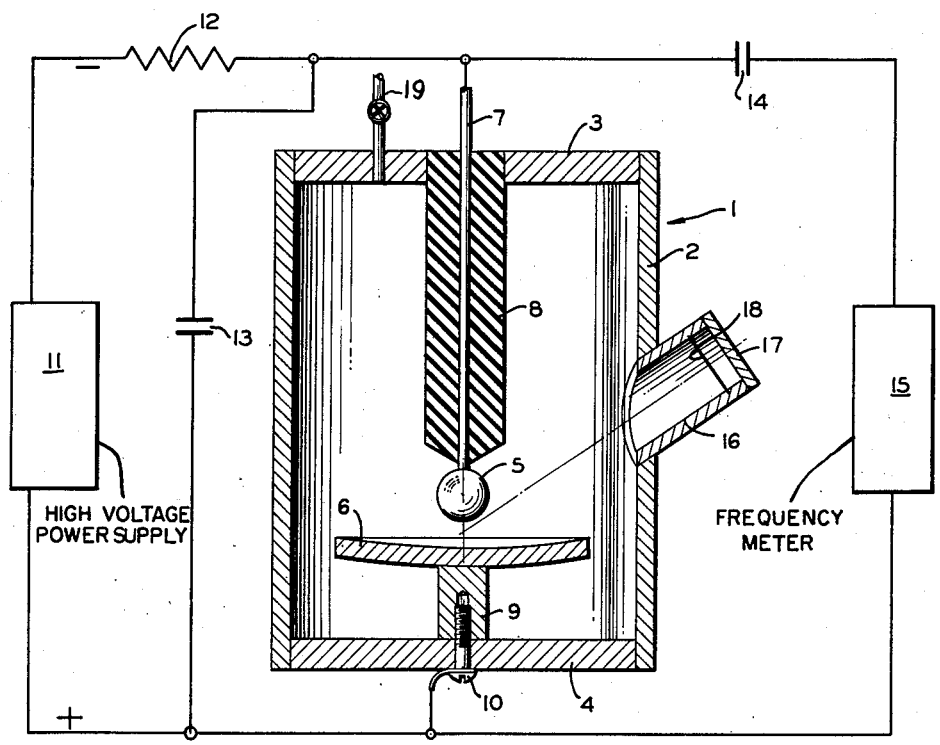
FIG_1
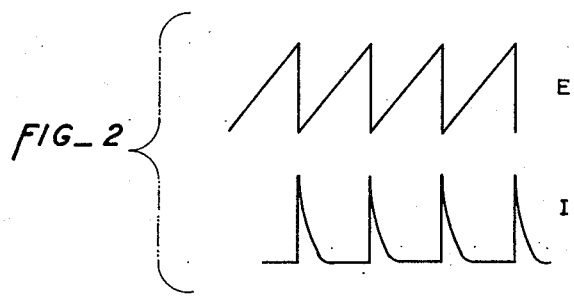
FIG_2
INVENTORS
RALPH F. REDEMSKE
JAMES M. BRADY
BY
ATTORNEY 0
United States Patent Office 3,126,511
Patented Mar. 24, 1964

3,126,511
ELECTRONIC DEVICE
Ralph F. Redemske and James M. Brady, Santa Barbara, Calif., assignors to Servomechanisms, Inc., Hawthorne, Calif., a corporation of New York
Filed July 19, 1956, Ser. No. 598,880
15 Claims. (Cl. 324—33)

This invention relates to oscillators, densitometers and altimeters.

It is an object of this invention to provide an oscillator of simple construction.

It is a further object of this invention to provide an oscillator comprising essentially an oscillatory ion chamber.

It is an additional object of this invention to provide a densitometer wherein the density transducer comprises an oscillatory ion chamber.

It is another object of this invention to provide an altimeter covering an altitude range not measurable by portable instruments now known to the art, i.e. the range of 70,000 to 250,000 feet.

The foregoing and further objects of the invention will become apparent, and the invention will be more fully understood, by reference to the following specification describing a selected embodiment of this invention as illustrated in the accompanying drawings wherein:

FIG. 1 is a diagrammatic representation of one form of oscillatory ion chamber and the accompanying electrical circuit; and FIG. 2 is a diagrammatic representation of the current and voltage wave shapes and their phase relations.

Structure

In the selected embodiment of this invention, an oscillator is constructed in the form of an ion chamber 1. As illustrated, the ion chamber 1 comprises a cylindrical casing 2, having a length of 4″ and a diameter of 3″, provided with end walls 3, 4. There are arranged within the cylindrical casing a negative electrode 5 and a positive electrode 6.

The negative electrode 5 is formed of a polished steel ball bearing having a diameter of 3/8 of an inch. This steel ball 5, is mounted on and supported by a conductor 7 which extends outwardly through an insulator 8 secured in an opening in the end wall 3 of the chamber.

The positive electrode 6 is formed of a highly polished concave metal disk having a diameter of 2″ and a radius of curvature of 6″. The positive electrode is spaced a distance of 0.1 inch from the negative electrode 5 at the closest point. The electrode 6 is mounted upon and supported by a conductor 9. This conductor 9 is electrically connected to and supported by the end wall 4 of the ion chamber by means of a screw 10.

A source of direct current is impressed across the electrodes 5 and 6. As illustrated, these means comprise a high voltage source 11 regulated at approximately 1,000 volts which is connected across the electrodes 5 and 6 in series with a resistance 12 of approximately 10 megohms.

A capacitor 13 of approximately .0005 microfarad is connected across the electrodes 5 and 6.

This circuit thus described is oscillatory under the conditions later described in this specification. The A.C. output of the oscillatory circuit is fed through a blocking capacitor 14 to a frequency measuring means 15, such as a digital computer.

For certain purposes, the ion chamber 1 should be provided with means for supplying ionizing means, such as alpha particles to the region between the electrodes 5 and 6. As illustrated, these means include a tubular extension 16 arranged outwardly from the cylindrical casing 2 so that the axis of the extension 16 intersects the region lying between the two electrodes 5 and 6. The outer end of the extension 16 is closed by an end cap 17 and a source of alpha particles such as a radioactive foil 18 containing, for example, radium 226, is carried upon the inner face of the end cap 17.

Operation

The ion chamber 1 is now filled with an atmosphere representing a density equal to the density of the atmosphere in the range of 70,000 feet to 250,000 feet. If the components are selected as described above, the illustrative device oscillates with a current wave shape in the form of pulses having a steep front and an exponential decay and with a sawtooth type voltage wave shape. The wave shapes and their phase relations are illustrated in FIG. 2.

The oscillator produces an audio tone varying from zero frequency up to about 20,000 cycles per second, depending upon the conditions hereinafter pointed out. The A.C. output of the oscillator varies from approximately 200 volts at high densities to about 20 volts at low densities.

These characteristics of the oscillator give it a utility in obtaining digital output information (i.e. frequency) from an analogue variable (e.g. density). These characteristics are illustrated in two exemplar modes of operation described below.

If density within the chamber is maintained at a constant value, then the frequency varies inversely in relation to the value of the capacitance of the circuit (e.g. the value of the capacitance 13 plus the distributed capacity of the circuit and of the chamber) and to the value of the resistor 12 and varies directly with the current flow through the ion chamber.

The equation for the operation of the instrument for the condition of constant pressure or density thus described is as follows:

$$\text{Frequency} = \frac{K_1 \times I}{RC}$$

R represents the series resistance; C the total capacitance of the circuit; I the current; and $K_1$ an approximate constant.

If the current through the device is made constant the device then oscillates at frequencies inversely proportional to the logarithm of the density of the atmosphere within the device. This makes the device extremely useful in measuring density or density altitude. When so used, an opening or gaseous connection 19 is provided in the device so that the atmosphere within the device is the same as the atmosphere undergoing measurement. With constant current supplied to the device, the equation turns out to be:

$$\text{Frequency} = \frac{K_2 \times \log \text{density}^{-1}}{RC}$$

In making tests with the illustrative device, we have found it to be operable in the range of 57 mm. of Hg to .02 mm. of Hg. According to available data, we have computed the log density to be equivalent to changes of density altitude equal to the range from 70,000 to 250,000 feet.

This gives the device unusual utility as an altimeter. The reason for this is that suitable portable instruments are now available for effectively measuring altitude from ground level up to 80,000 feet such as, for example, aneroid diaphragms, bellows and Bourdon tube barometric type altimeters. Suitable portable instruments are also available for measuring altitudes above 200,000 feet, such as, for example, the Philips and the Pirani gauges. However, heretofore there has been no practical portable instrument known to applicants capable of measuring altitudes throughout the range covered by the instant invention, to wit: 70,000 to 250,000 feet.

*Operational and Structural Details*

Applicants have found it essential to operate the device both in the gaseous amplification region and in the extended negative resistance region.

As is well known in the art of ion chamber devices, the usual operating region is usually termed the saturation region. Above this region, there occurs a gaseous amplification region. In the gaseous amplification region, the device has a current multiplication value as high as $10^5$ times the value in the saturation region.

The extended negative resistance region is that operating region which is known in the art as the sub-normal glow region. In the illustrative embodiment, operation in this region is readily obtained with the specific embodiment described and may also be obtained with variations in the geometry of the elements as well as variations in the external circuit arrangements. It is merely necessary to so design and so select the various elements and components so that the voltage drop across the ion chamber decreases with increases in current through the ion chamber.

For repetitive results as a densitometer, the voltage source to the system or the current flow through the system must be made constant. The particular value of the voltage or current is unimportant provided that the voltage or current selected must be of a value at which the device operates in the so-called gas amplification region.

Applicants have also found that the range of the illustrative embodiment may be varied by changes in the shape of the electrodes, the voltage used, the spacing of the electrodes and other changes in the components. By way of example, applicants have found that the lower altitude limit of the range may be extended downwardly by increasing the volts per inch gradient between the electrodes. This, by way of example, can be done either by increasing the voltage, or by moving the electrodes closer together, or by a combination of the two. Applicants have also learned that the upward limit of the range may be extended upwardly by increasing the spacing between the electrodes.

Applicants have found it to be important to insulate the negative electrode rather than the positive electrode. If the positive electrode is insulated, sputtering from the negative electrode in time coats the insulator with a thin coating of metal and eventually causes the device first to become erratic and eventually inoperative. This result does not occur when the negative electrode is insulated.

The source of alpha particles has been found to give the oscillator stability of operation at higher ranges of density. This is true because it supplies particles to the region between the electrodes and insures oscillation stability when the uncertainty of ionization of the particles in the atmosphere within the device would otherwise tend to create instability.

Applicants have confirmed that the chamber operates in response to density rather than to pressure by hermetically sealing the chamber at a fixed pressure. The unit was then subjected to heat over a considerable range of temperatures while observing the frequencies of the output. A considerable pressure change took place in the sealed unit due to changes in temperature but the density remained constant since the volume within the device did not change and gas molecules could neither enter nor leave the device. Throughout the tests there was essentially no frequency change, thus proving the device to be a density device rather than a pressure device.

Having thus described a selected embodiment of the invention, it will be apparent that numerous other objects and advantages may be obtained and that equivalents may be substituted for many of the specific elements disclosed. It is, therefore, to be understood that the specific disclosures herein are capable of numerous modifications and changes without departing from the spirit and scope of the invention, the invention being limited to and being defined in the appended claims.

Having thus described our invention, what we claim as new and desire to secure by Letters Patent are:

1. An oscillatory circuit comprising a gaseous discharge device, including a housing, two electrodes within said housing, and means for subjecting the atmosphere within the device to an atmosphere exterior the device; capacitance means arranged in parallel with said electrodes; a constant voltage source of direct current connected to said electrodes; a resistance in series with said source of direct current and said electrodes; and means for measuring the frequency of oscillation of said oscillatory circuit.

2. A gaseous discharge device comprising a housing; a negative electrode within said housing being electrically insulated from said housing; a positive electrode within said housing being electrically connected to said housing; said negative electrode being constructed in the form of a polished metal sphere and said positive electrode being constructed in the form of a polished metal concave disk; and ionizing means for sustaining an ionized condition of the atmosphere within said gaseous discharge device.

3. A gaseous discharge device comprising a housing; a negative electrode within said housing being electrically insulated from said housing; a positive electrode within said housing being electrically connected to said housing; said negative electrode being constructed in the form of a polished metal sphere and said positive electrode being constructed in the form of a polished metal concave disk; and ionizing means for sustaining an ionized condition of the atmosphere within said gaseous discharge device, said ionizing means comprising a source of alpha particles.

4. A densitometer comprising an oscillatory circuit, including the gaseous discharge device defined in claim 2.

5. An altimeter comprising an oscillatory circuit, including the gaseous discharge device defined in claim 2.

6. A densitometer comprising an oscillatory circuit, including the gaseous discharge device defined in claim 3.

7. An altimeter comprising an oscillatory circuit, including the gaseous discharge device defined in claim 3.

8. An oscillatory circuit as defined in claim 1 wherein the constant voltage source is sufficient to operate said gaseous discharge device in the gas amplifying region.

9. An oscillatory circuit comprising a gaseous discharge device including a housing, two electrodes within said housing, and means for subjecting the atmosphere within the device to an atmosphere exterior the device; capacitance means arranged directly in parallel with said electrodes; a constant voltage source of direct current connected to said electrodes and a resistance in series with said electrodes; the component elements being selected and arranged so that the gaseous discharge device is operable in the sub-normal glow region.

10. An oscillatory circuit comprising a gaseous discharge device including a housing, two electrodes within said housing, and means for subjecting the atmosphere within the device to an atmosphere exterior the device; a source of constant direct current connected to said electrodes and a resistance in series with said electrodes; the component elements being selected and arranged so that the gaseous discharge device is operable in the sub-normal glow region.

11. A densitometer for measuring the density of exterior atmosphere comprising a gaseous discharge device, including a housing and two electrodes within said housing; capacitance means arranged in parallel with said electrodes; a constant voltage source of direct current connected to said electrodes; a resistance in series with said source of direct current and said electrodes; said elements forming an oscillatory circuit; means for subjecting the atmosphere within said gaseous discharge device to the atmosphere exterior the device, the density of which is to be measured; and means for measuring the frequency of oscillation of said oscillatory circuit whereby the density of the atmosphere exterior the device is measured by the frequency of oscillation of said oscillatory circuit.

12. An altimeter for measuring the density altitude of exterior atmosphere comprising a gaseous discharge device, including a housing and two electrodes within said housing; capacitance means arranged in parallel with said electrodes; a constant voltage source of direct current connected to said electrodes; a resistance in series with said source of direct current and said electrodes; said elements forming an oscillatory circuit; means for subjecting the atmosphere within said gaseous discharge device to an atmosphere exterior the device, the density altitude of which is to be measured; and means for measuring the frequency of oscillation of said oscillatory circuit whereby the density altitude exterior the device is measured by the frequency of oscillation of said oscillatory circuit.

13. An analogue to digital converter comprising a gaseous discharge device including a housing and two electrodes within said housing; capacitance means arranged in parallel with said electrodes; a constant voltage source of direct current connected to said electrodes; a resistance in series with said source of direct current and said electrodes; the component elements being selected and arranged so that the gaseous discharge device is operable in the sub-normal glow region and forming an oscillatory circuit wherein changes in current are measurable by changes in frequency; and means for subjecting the atmosphere within said gaseous discharge device to an atmosphere exterior the device.

14. An analogue to digital converter comprising a gaseous discharge device including a housing and two electrodes within said housing; capacitance means arranged in parallel with said electrodes; a constant voltage source of direct current connected to said electrodes; a resistance in series with said source of direct current and said electrodes; the component elements being selected and arranged so that the gaseous discharge device is operable in the sub-normal glow region and forming an oscillatory circuit wherein changes in density are measurable by changes in frequency; and means for subjecting the atmosphere within said gaseous discharge device to an atmosphere exterior the device.

15. An analogue to digital converter comprising a gaseous discharge device including a housing and two electrodes within said housing; a constant voltage source of direct current connected to said electrodes; a resistance in series with said source of direct current and said electrodes; the component elements being selected and arranged so that the gaseous discharge device is operable in the sub-normal glow region and forming an oscillatory circuit wherein changes in density are measurable by changes in frequency; and means for subjecting the atmosphere within said gaseous discharge device to an atmosphere exterior the device.

References Cited in the file of this patent

UNITED STATES PATENTS

| | | |
|---|---|---|
| 1,555,259 | Allcutt | Sept. 29, 1925 |
| 1,832,402 | Langer | Nov. 17, 1931 |
| 2,391,611 | Back | Dec. 25, 1945 |
| 2,497,213 | Downing | Feb. 14, 1950 |
| 2,576,100 | Brown | Nov. 27, 1951 |
| 2,617,088 | Cohen | Nov. 4, 1952 |

OTHER REFERENCES

"Laboratory and Workshop Notes," Journal of Scientific Instruments, vol. 27, Issue No. 3, page 76, March 1950, QC 184.J7.